(12) United States Patent
Kao et al.

(10) Patent No.: US 6,239,200 B1
(45) Date of Patent: May 29, 2001

(54) COMPOSITION AND PROCESS FOR PREPARING HIGH MOLECULAR WEIGHT POLYESTER

(75) Inventors: Hsin-Ching Kao; Lee-Hua Chen; Chi-Lang Wu; Jinn-Jong Wong; Szu-Yuan Chan; Sheng-Te Yang, all of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/525,451

(22) Filed: Mar. 14, 2000

(30) Foreign Application Priority Data

Dec. 27, 1999 (TW) ................................................ 088122989

(51) Int. Cl.$^7$ ..................................................... C08K 5/52
(52) U.S. Cl. .......................... 524/127; 528/272; 528/296; 528/298; 528/303; 528/308; 528/308.6
(58) Field of Search ..................................... 528/272, 296, 528/298, 303, 308, 308.6; 524/127

(56) References Cited

U.S. PATENT DOCUMENTS 5,693,681 * 12/1997 Pfaendner et al. ..................... 521/48

* cited by examiner

*Primary Examiner*—Samuel A. Acquah
(74) *Attorney, Agent, or Firm*—Sughrue, Mion, Zinn, Macpeak & Seas, PLLC

(57) ABSTRACT

A composition suitable for use as a starting material for preparing a high molecular weight polyester through melt polymerization and solid state polymerization is disclosed. The composition comprises (a) a dicarboxylic acid or diester; (b) a glycol; (c) 0.1–5 mol %, relative to said component (a), of a multifunctional acid and/or a multifunctional alcohol; and (d) 0.05–5 wt %, based on the weight of the polyester, of a hindered phenolic aromatic phosphate. A process for preparing a high molecular weight polyester utilizing the above composition is also disclosed.

14 Claims, No Drawings

COMPOSITION AND PROCESS FOR PREPARING HIGH MOLECULAR WEIGHT POLYESTER

BACKGROUND OF THE INVENTION

1. Field of the Invention

The present invention relates in general to preparation of a high molecular weight polyester. More particularly, it relates to a composition and a process for preparing a high molecular weight polyester.

2. Description of the Related Arts

High molecular weight polyesters (polyesters having high intrinsic viscosity) are required for a variety of industrial uses. Such polyesters are commonly produced from low molecular weight polyesters of the same composition, in the form of particles or pellets, by solid state polymerization. However, the manufacture is time- and energy-consuming and necessitates a marked increase in manufacturing costs.

In the solid state polymerization of a polyester prepolymer, the polymerization is carried out at an elevated temperature which is below the melting point of the polyester resin. Such polymerization is normally conducted in the presence of a stream of inert gas or under a vacuum to remove volatile reaction byproducts such as ethylene glycol. This removal of the byproduct promotes the polycondensation polymerization through both the esterification and transesterification reaction mechanisms.

There have been attempts to accelerate the solid state polymerization by reducing the size of the pellets of polyester prepolymers to favor the removal of the byproduct. However, only a trivial improvement is achieved, not to mention the requirement of additional pulverizer equipment.

As further background for increasing the reaction rate of solid state polymerization, attention is directed to U.S. Pat. Nos. 4,150,214 and 5,714,262; and World Patent Application No. 9622320.

SUMMARY OF THE INVENTION

It is therefore an object of the invention to solve the above-mentioned problems and provide a composition and a process for preparing a high molecular weight polyester which may increase the solid state polymerization reaction rate.

The present invention attains the above object by utilizing chemical modification methodology. According to a feature of the invention, a copolymer having multifunctional reactive groups is employed to promote polymerization and branching reaction so as to accelerate the polymerization and increase the intrinsic viscosity (I.V.) of the polyester. According to another feature of the invention, a particular heat stabilizer which can catalyze the solid state polymerization is employed to suppress pyrolysis and oxidization of the polyester at an elevated temperature.

According to the invention, the composition suitable for use as a starting material for preparing a high molecular weight polyester comprises:

(a) a dicarboxylic acid or diester thereof;
(b) a glycol;
(c) 0.1–5 mol %, relative to the component (a), of a multifunctional acid and/or alcohol; and
(d) 0.05–5 wt %, based on the weight of the polyester, of a hindered phenolic aromatic phosphate.

The present process for preparing a high molecular weight polyester comprises the steps of:

(1) preparing a polyester prepolymer having an intrinsic viscosity about 0.55–0.65 by melt polymerization of:
(a) a dicarboxylic acid or diester thereof; (b) a glycol; (c) 0.1–5 mol %, relative to the component (a), of a multifunctional acid and/or alcohol; and (d) 0.05–5 wt %, based on the weight of the polyester, of a hindered phenolic aromatic phosphate; and (2) solid state polymerizing the prepolymer to produce a polyester having an intrinsic viscosity of at least 0.7.

DETAILED DESCRIPTION OF THE INVENTION

In the composition according to the present invention, a dicarboxylic acid or diester thereof is used as the component (a). Especially preferred are aromatic diacids including such as terephthalic, isophthalic and naphthalaic dicarboxylic acid, or combinations thereof.

In the composition according to the present invention, a glycol is used as the component (b). Especially preferred are alkane diols of 2–10 carbon atoms including such as ethylene glycol, butylene glycol, diethylene glycol, 1,3-propanediol, dimethyl-1,3-propanediol, cyclohexanediol, 2-ethyl-2-butyl-1,3-propanediol, or combinations thereof.

In the composition according to the present invention, a copolymer having multifunctional reactive groups such as a multifunctional acid and/or alcohol is employed as the component (c). The multifunctional copolymer used herein promotes polymerization and branching reaction, thereby increasing the reaction rate and the I.V. of the polyester.

Illustrative of multifunctional acids used in the present invention include such as trimellitic anhydride (TMA) and pyromellitic dianhydride (PMDA). A particularly preferred multifunctional acid is trimellitic anhydride. Illustrative of multifunctional alcohols include such as trimethylol propane (TMP) and pentaerythritol. A particularly preferred multifunctional alcohol is trimethylol propane. The multifunctional copolymer is present in an amount of 0.1–5 mol %, and preferably 0.1–3 mol % based on the molar proportion of the dicarboxylic acid reactant, e.g., the component (a).

In the composition according to the present invention, a high molecular weight hindered phenolic aromatic phosphate is employed as the component (d). The hindered phenolic aromatic phosphate herein is used as a heat stabilizer and a polymerization catalyst as well. It serves to protect the polyester from pyrolysis and oxidization during the solid state polymerization process and also serves to catalyze the solid state polymerization. The hindered phenolic aromatic phosphate is present in an amount of 0.05–5 wt %, and preferably 0.1–2.5 wt % based on the weight of the polyester. A particularly preferred hindered phenolic aromatic phosphate is IRGANOX 1425 manufactured by Ciba Geigy.

Other conventional additives for polyester resins can be present in the composition of the invention. Such additives include stabilizers and inhibitors of oxidative, thermal, and ultraviolet light degradation; lubricants; colorants including dyes and pigments; fillers; flame retardants; nucleating agents, etc.

The general process of the present invention for preparing a high molecular weight polyester will be described below.

In the process of the invention, a polyester prepolymer having an I.V. of about 0.55–0.65 is first prepared by a conventional melt polymerization process from the components (a), (b), (c), and (d). Then the polyester prepolymer is subjected to solid state polymerization to produce a high molecular weight polyester having an I.V. of at least 0.7.

Examples of polyesters include polyethylene terephthalate (PET), polybutylene terephthalate (PBT), polyethylene naphthalate (PEN), copolymers of PET, copolymers of PBT and copolymers of PEN. A particularly preferred polyester is PET.

It is often desirable to carry out the melt polymerization in two stages, that is, esterification and polycondensation. The polyester prepolymers can be produced by direct esterification of the acid, or by ester exchange with the esters of the acids, and followed by polycondensation. For example, PET may be formed from ethylene glycol by direct esterification with terephthalic acid, or by ester exchange between ethylene glycol and dimethyl terephthalate, and followed by polycondensation.

The esterification of the dicarboxylic acid and/or the esters thereof and the glycol can be carried out at a temperature ranging from 200° C. to 250° C. The reaction, either the direct esterification or ester interchange, is normally carried out in the absence of oxygen-containing gas. The polycondensation is usually carried out at a temperature ranging from 260° C. to 300° C. and at a low pressure of about 0.1 torr. The polycondensation reaction continues until the desired intrinsic viscosity of about 0.55 to 0.65 is reached.

The prepolymer is then solidified, pelletized and transferred to a solid state polymerization reactor to complete the polycondensation reactions. Solid polymer particles are heated above the glass transition temperature (Tg) of the polymer but below the melting point temperature (Tm). This is done under vacuum or flow of inert gas, such as nitrogen, to remove the by-products of the condensation reaction. With the present process, the reaction time of solid state polymerization is reduced by ⅓ as compared to conventional technology. Accordingly, the process of this invention greatly reduces the energy requirements required in order to increase the I.V. of a polyester prepolymer to a given higher I.V. which is desired.

Without intending to limit it in any manner, the present invention will be further illustrated by the following examples.

EXAMPLE 1

A PET prepolymer having an I.V. of 0.60 was prepared utilizing a melt polymerization process. The starting materials and their amounts (parts by weight) are given in Table 1. Terephthalic acid (TPA), isophthalic acid (IPA), bishydroxyethyl terephthalate (BHET), and ethylene glycol (EG) were charged into a 3.5 L esterification reactor which was operated at 230° C. and 3 kg/cm². Water byproduct produced during the esterification was distilled off. Following this, trimellitic anhydride (TMA), IRGANOX 1425 (Ciba Geigy), and $Sb_2O_3$ as a polymerization catalyst were charged into the reactor and the temperature was raised to 310° C. The excess ethylene glycol was distilled off and removed by a stream of nitrogen. To proceed polycondensation, the nitrogen stream was stopped and the pressure in the reactor was gradually reduced to about 0.1–0.6 torr. The polycondensation was allowed to proceed until the intrinsic viscosity reached 0.60. After the vacuum was released with a flow of dry nitrogen, the prepolymer melt was extruded into chilled water. The prepolymer was dried in air and then ground into powders.

The prepolymer powders were fed in to a solid state polymerization reactor which was operated at 220° C. and 0.5 torr. At regular intervals part of the "prepolymer" was removed from the reactor (vacuum released with dry nitrogen first) and subjected to intrinsic viscosity measurement. The results are also shown in Table 1.

EXAMPLE 2

The same procedure as in Example 1 was repeated, except that trimellitic anhydride was replaced by trimethylol propane (TMP).

Comparative Example

The same procedure as in Example 1 was repeated, except without adding trimellitic anhydride and IRGANOX 1425.

TABLE 1

| Starting materials | Comparative Example | Example 1 | Example 2 |
|---|---|---|---|
| TPA | 159.3 | 159.3 | 159.3 |
| BHET | 96 | 96 | 96 |
| IPA | 6.7 | 6.7 | 6.7 |
| EG | 105 | 105 | 105 |
| $Sb_2O_3$ | 0.087 | 0.087 | 0.087 |
| TMA | — | 0.5 | — |
| TMP | — | — | 0.5 |
| IRGANOX 1425 | — | 0.5 | 0.5 |
| I.V. of prepolymer | 0.60 | 0.60 | 0.60 |
| I.V. after 8 hrs | 0.70 | 0.83 | 0.82 |
| I.V. after 16 hrs | 0.78 | 0.97 | 0.95 |

The data in Table 1 clearly show that the utilization of the multifunctional copolymer and hindered phenolic aromatic phosphate results in a much faster rate of solid state polymerization. Accordingly, this invention can be utilized to greatly increase the throughput of a given solid state polymerization reactor.

While the invention has been particularly shown and described with reference to the preferred embodiment thereof, it will be understood by those skilled in the art that various changes in form and details may be made without departing from the spirit and scope of the invention.

What is claimed is:

1. A composition suitable for use as a starting material for preparing a high molecular weight polyester through melt polymerization and solid state polymerization, which comprises:

(a) a dicarboxylic acid or diester thereof;
   (b) a glycol;
   (c) 0.1–5 mol %, relative to said component (a), of a multifunctional acid and/or alcohol; and
   (d) 0.05–5 wt %, based on the weight of the polyester, of a hindered phenolic aromatic phosphate.

2. The composition as claimed in claim 1, wherein said dicarboxylic acid is selected from the group consisting of terephthalic acid, isophthalic acid, naphthalaic dicarboxylic acid, and combinations thereof; and said glycol is alkane diols of 2–10 carbon atoms.

3. The composition as claimed in claim 1, wherein said dicarboxylic acid is terephthalic acid, and said glycol is ethylene glycol.

4. The composition as claimed in claim 1, wherein said multifunctional acid is selected from the group consisting of trimellitic anhydride and pyromellitic dianhydride.

5. The composition as claimed in claim 1, wherein said multifunctional acid is trimellitic anhydride.

6. The composition as claimed in claim 1, wherein said multifunctional alcohol is selected from the group consisting of trimethylol propane and pentaerythritol.

7. The composition as claimed in claim 1, wherein said multifunctional alcohol is trimethylol propane.

8. A process for preparing high molecular weight polyester, comprising the steps of:
(1) preparing a polyester prepolymer having an intrinsic viscosity of about 0.55–0.65 by melt polymerization of:
(a) a dicarboxylic acid or diester thereof;
(b) a glycol;
(c) 0.1–5 mol %, relative to said component (a), of a multifunctional acid and/or alcohol; and
(d) 0.05–5 wt %, based on the weight of the polyester, of a hindered phenolic aromatic phosphate; and
(2) solid state polymerizing said prepolymer to produce a polyester having an intrinsic viscosity of at least 0.7.

9. The process as claimed in claim 8, wherein said dicarboxylic acid is selected from the group consisting of terephthalic acid, isophthalic acid, naphthalaic dicarboxylic acid, and combinations thereof; and said glycol is alkane diols of 2–10 carbon atoms.

10. The process as claimed in claim 8, wherein said dicarboxylic acid is terephthalic acid, and said glycol is ethylene glycol.

11. The process as claimed in claim 8, wherein said multifunctional acid is selected from the group consisting of trimellitic anhydride, and pyromellitic dianhydride.

12. The composition as claimed in claim 8, wherein said multifunctional acid is trimellitic anhydride.

13. The composition as claimed in claim 8, wherein said multifunctional alcohol is selected from the group consisting of trimethylol propane, and pentaerythritol.

14. The composition as claimed in claim 8, wherein said multifunctional alcohol is trimethylol propane.

* * * * *